United States Patent
Weinberg et al.

(10) Patent No.: US 10,119,023 B2
(45) Date of Patent: *Nov. 6, 2018

(54) POLYMER COMPOSITION

(75) Inventors: Shari Weinberg, Atlanta, GA (US); Shawn Shorrock, Cumming, GA (US); Mohammad Jamal El-Hibri, Atlanta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 803 days.

This patent is subject to a terminal disclaimer.

(21) Appl. No.: 12/281,744

(22) PCT Filed: Mar. 16, 2007

(86) PCT No.: PCT/EP2007/052522
§ 371 (c)(1),
(2), (4) Date: Sep. 4, 2008

(87) PCT Pub. No.: WO2007/107519
PCT Pub. Date: Sep. 27, 2007

(65) Prior Publication Data
US 2009/0048379 A1 Feb. 19, 2009

Related U.S. Application Data

(60) Provisional application No. 60/783,062, filed on Mar. 17, 2006.

(30) Foreign Application Priority Data

Jun. 22, 2006 (EP) .................................. 06115871
Aug. 3, 2006 (EP) .................................. 06118409

(51) Int. Cl.
*C08L 71/00* (2006.01)
*C08L 71/10* (2006.01)
*C08L 81/06* (2006.01)

(52) U.S. Cl.
CPC .............. *C08L 71/00* (2013.01); *C08L 71/10* (2013.01); *C08L 81/06* (2013.01)

(58) Field of Classification Search
USPC ........................................ 524/420, 494, 542
See application file for complete search history.

(56) References Cited

U.S. PATENT DOCUMENTS

| | | | |
|---|---|---|---|
| 3,634,355 A | 1/1972 | Barr et al. | |
| 4,008,203 A | 2/1977 | Jones | |
| 4,108,837 A | 8/1978 | Johnson et al. | |
| 4,175,175 A | 11/1979 | Farnham et al. | |
| 4,176,222 A | 11/1979 | Cinderey et al. | |
| 4,624,997 A | 11/1986 | Robeson et al. | |
| 4,713,426 A * | 12/1987 | Harris et al. | 525/471 |
| 4,804,724 A | 2/1989 | Harris et al. | |
| 4,942,216 A | 7/1990 | Heinz et al. | |
| 4,957,962 A | 9/1990 | Winkler et al. | |
| 5,008,364 A * | 4/1991 | Ittemann et al. | 528/172 |
| 5,916,958 A | 6/1999 | Kelly et al. | |
| 6,566,484 B2 | 5/2003 | Gharda et al. | |
| 2003/0130476 A1 | 7/2003 | Kemmish et al. | |

FOREIGN PATENT DOCUMENTS

| | | |
|---|---|---|
| CA | 847963 A | 7/1970 |
| DE | 19513403 A1 | 10/1996 |
| EP | 0212805 A2 | 3/1987 |
| EP | 0224236 A2 | 6/1987 |
| EP | 0254455 A2 | 1/1988 |
| EP | 0297363 A2 | 1/1989 |
| EP | 0316681 A2 | 5/1989 |
| EP | 0327984 A2 | 8/1989 |
| EP | 0356948 A2 | 3/1990 |
| WO | WO9932565 A2 | 7/1999 |
| WO | WO2007071779 A1 | 6/2007 |
| WO | WO2007071780 A1 | 6/2007 |
| WO | WO2008003659 A1 | 1/2008 |

OTHER PUBLICATIONS

PCT Search Report from ISO/EPO dated May 23, 2005 for International Application No. 2007/EP2007/052522 (3 p.).
EPO Search Report dated Nov. 24, 2006 for European Application No. 06118409.9 (3 p.).

* cited by examiner

*Primary Examiner* — Ling Siu Choi
*Assistant Examiner* — Thuy-Ai N Nguyen
(74) *Attorney, Agent, or Firm* — Osha Liang LLP

(57) ABSTRACT

Polymer composition (C) comprising
a poly(aryl ether ketone) (P1) chosen from polyetheretherketones, polyetherketoneketones and polyetheretherketone-polyetherketoneketone copolymers,
a polyphenylsulfone (P2), and
a reinforcing fiber (F),
with the exception of
a polymer composition consisting of
90 wt %, based on the total weight of the polymer composition, of a polymer blend consisting of 85 parts by weight of a polyphenylsulfone and 15 parts by weight of a polyetheretherketone, and
10 wt %, based on the total weight of the polymer composition, of glass fiber.

22 Claims, No Drawings

POLYMER COMPOSITION

CROSS-REFERENCE TO RELATED APPLICATIONS

This application is a U.S. national stage application under 35 U.S.C. § 371 of International Application No. PCT/EP2007/052522, filed Mar. 16, 2007, which claims the priority benefit under 35 U.S.C. § 119(e) of (i) U.S. provisional Application No. 60/783062, filed Mar. 17, 2006, and further claims the priority benefit under 35 U.S.C. § 119(a) and (b) of (ii) European Application No. 06115871.3, filed Jun. 22, 2006, and (iii) European Application No. 06118409.9, filed Aug. 3, 2006, the whole content of all of these applications being herein incorporated by reference for all purposes.

FIELD OF THE INVENTION

The present invention relates to a new reinforced polymer composition.

BACKGROUND OF THE INVENTION

Poly(biphenyl ether sulfone)s, in particular polyphenylsulfones (PPSU), are amorphous technopolymers which are materials of choice notably for the ultimate in toughness, with rather good stiffness, rather good chemical resistance, superior to most of commercially available transparent resins but lower than that of ultra-performance polymers like poly(aryl ether ketone)s.

Precisely, poly(aryl ether ketone)s, in particular polyetheretherketones (PEEK) and polyetherketoneketones (PEKK), offer an exceptional balance of technical properties, namely high melting point, excellent thermal stability, high stiffness and strength, good toughness and really excellent chemical resistance, including excellent resistance to chemicals after exposure to said chemical under stress ("environmental stress rupture resistance").

However, for certain applications, a higher level of stiffness is required, which cannot be achieved with a poly(aryl ether ketone) taken alone, and, a fortiori, with a poly(biphenyl ether sulfone) taken alone. A known solution, among others, consists in incorporating a reinforcing filler to the neat polymer. Non limitative examples of reinforcing fillers include particulate fillers like nanoclays, and fibrous fillers like glass fibers and carbon fibers. Thus, for example, certain glass-filled PEEKs have been developed and found a certain commercial success.

Yet, as concerns said glass-filled PEEKs and more generally reinforced poly(aryl ether ketone)s, their high cost (which is due to the high cost of the poly(aryl ether ketone)s themselves), remains often dissuasive, refraining the skilled person from using them as widely as technically desirable for the encompassed applications (shaped articles), in particular when, a high initial stiffness is mandatory and must be retained inasmuch as possible after the shaped articles or at least some part(s) thereof are contacted, temporarily or permanently, with an aggressive chemical environment under stress.

There remains thus a strong need for a composition of matter exhibiting a level of properties (in particular of chemical resistance, and very particularly of environmental stress rupture resistance) as high or substantially as high as the one achieved with reinforced poly(aryl ether ketone)s, at a lower cost than that of said reinforced poly(aryl ether ketone)s.

The challenge appeared tricky for the Applicant, notably in view of the teachings of U.S. Pat. No. 4,804,724, as commented below.

U.S. Pat. No. 4,804,724, the whole content of which is herein incorporated by reference, describes unreinforced blends comprising a poly(aryl ether ketone) and a poly(biphenyl ether sulfone). As expected, these blends, at intermediate compositions (such as 50 parts of PPSU and 50 parts of PEEK), exhibit intermediate properties, in particular an intermediate stiffness (modulus) and an intermediate chemical resistance (including an intermediate environmental stress rupture resistance) in certain chemical environments (ethyl acetate, 1,1,1-trichloroethane, toluene and acetone) in the range between the (high) chemical resistance of the poly(aryl ether ketone) and the (substantially lower) chemical resistance of the poly(biphenyl ether sulfone). Thus, in short, the skilled in the art, in view of the teachings of U.S.'724, would have understood that replacing part of the poly(aryl ether ketone) contained in a poly(aryl ether ketone) composition, whatever reinforced or not, by a usually more cost-attractive polymer, in particular a poly(biphenyl ether sulfone), should not be an appropriate means to solve the complex problem of reducing the cost of the poly(aryl ether ketone) composition while at least substantially maintaining the chemical resistance conferred by the poly(aryl ether ketone).

U.S. Pat. No. 5,916,958 addresses the problem of improving the flame retardancy of poly(biphenyl ether sulfone) compositions, including but not limited to PPSU compositions; to solve this problem, a fluorocarbon polymer and titanium dioxide should be added to the poly(biphenyl ether sulfone)composition. Optionally, the poly(biphenyl ether sulfone) compositions of US'958 comprise further a poly(aryl ether ketone), including but not limited to PEEK and PEKK. Other optional ingredients include fibrous fillers like glass fiber, as well as particulate fillers such as wollastonite, talc, silica and the like. U.S. Pat. No. 5,916,958 does not disclose any composition that would specifically comprise a poly(biphenyl ether sulfone), a poly(aryl ether ketone) and a fibrous filler, except comparative example N, which relates to a composition consisting of (i) 90 wt %, based on the total weight of the composition, of a polymer blend consisting of 85 parts by weight of a polyphenylsulfone (RADEL(r) R 5000 grade) and 15 parts by weight of a polyetheretherketone (VICTREX® PEEK grade 150 P), and (ii) 10 wt %, based on the total weight of the composition, of glass fiber. As earlier mentioned, this example is provided as comparative example, for the sole purpose of demonstrating that glass fiber makes it possible to achieve good heat release properties, even in the absence of fluorocarbon polymer and $TiO_2$, but would cause unacceptable unscratched impact values. This disclosure is totally unrelated with the complex problem addressed by the present invention.

THE INVENTION

The Applicant has found that the complex problem of providing a composition of matter exhibiting a level of properties (in particular of chemical resistance, and very particularly of environmental stress rupture resistance) at least substantially as high as the one achieved with reinforced poly(aryl ether ketone)s, at a lower cost than that of said reinforced poly(aryl ether ketone)s, is quite unexpectedly solved by a polymer composition (C) comprising:

a poly(aryl ether ketone) chosen from polyetheretherketones, polyetherketoneketones and polyetheretherketone-polyetherketoneketone copolymers, a diluent chosen from polyphenylsulfones, and
a reinforcing filler chosen from reinforcing fibers.

Thus, an aspect of the present invention is directed to a polymer composition (C) comprising
  a poly(aryl ether ketone) (P1) chosen from polyetheretherketones, polyetherketoneketones and polyetheretherketone-polyetherketoneketone copolymers,
  a polyphenylsulfone (P2), and
  a reinforcing fiber (F),
with the exception of
a polymer composition consisting of
  90 wt %, based on the total weight of the polymer composition, of a polymer blend consisting of 85 parts by weight of a polyphenylsulfone and 15 parts by weight of a polyetheretherketone, and
  10 wt %, based on the total weight of the polymer composition, of glass fiber.

Another aspect of the present invention is directed to a shaped article comprising the polymer composition (C) as above described.

Still another aspect of the present invention is directed to the use of a polyphenylsulfone (P2) for diluting a poly(aryl ether ketone) (P1) chosen from polyetheretherketones, polyetherketoneketones and polyetheretherketone-polyetherketoneketone copolymers,
said poly(aryl ether ketone) being contained in a polymer composition (C) which, before being diluted with the polyphenylsulfone (P2), consists of the poly(aryl ether ketone) (P1), a reinforcing fiber (F) and, optionally in addition, one or more ingredients other than the poly(aryl ether ketone) (P1), the polyphenylsulfone (P2) and the reinforcing fiber (F),
while at least substantially maintaining the chemical resistance, in particular the environmental stress rupture resistance, of the polymer composition (C) in a chemical environment which is more aggressive against the polyphenylsulfone (P2) than against the poly(aryl ether ketone) (P1).

According the above aspect, the polymer composition (C) may be notably in the form of a shaped article or part of a shaped article.

DETAILED DESCRIPTION OF THE INVENTION

The weight of the poly(aryl ether ketone) (P1), based on the total weight of the poly(aryl ether ketone) (P1) and the polyphenylsulfone (P2), is advantageously above 20%, preferably above 30%, more preferably above 40% and still more preferably above 45%. On the other hand, the weight of the poly(aryl ether ketone) (P1), based on the total weight of the poly(aryl ether ketone) (P1) and the polyphenylsulfone (P2), is advantageously below 80%, preferably below 70%, is more preferably below 60% and still more preferably below 55%.

The total weight of the poly(aryl ether ketone) (P1) and the polyphenylsulfone (P2), based on the total weight of the polymer composition (C), is advantageously above 35%, preferably above 55% and more preferably above 65%. On the other hand, the total weight of the poly(aryl ether ketone) (P1) and the polyphenylsulfone (P2), based on the total weight of the polymer composition (C), is advantageously below 85%, preferably below 80%, more preferably below 75%, and still more preferably at most 70%.

The weight of the poly(aryl ether ketone) (P1), based on the total weight of the polymer composition (C), is advantageously above 15%, preferably above 25%, and more preferably above 30%. On the other hand, the weight of the poly(aryl ether ketone) (P1), based on the total weight of the polymer composition (C), is advantageously below 50%, preferably below 45%, more preferably below 40% and still more preferably at most 35%.

The weight of the polyphenylsulfone (P2), based on the total weight of the polymer composition (C), is advantageously above 15%, preferably above 25%, and more preferably above 30%. On the other hand, the weight of the polyphenylsulfone (P2), based on the total weight of the polymer composition (C), is advantageously below 50%, preferably below 45%, more preferably below 40% and still more preferably at most 35%.

The amount of reinforcing fiber (F), based on the total weight of the polymer composition (C), is advantageously above 12 wt %, preferably above 18 wt % and more preferably above 24 wt %. On the other hand, the amount of reinforcing fiber (F), based on the total weight of the polymer composition (C), is advantageously below 60 wt %, preferably below 48 wt %, more preferably below 36 wt %, and still more preferably at most 30 wt %.

The poly(aryl ether ketone) (P1)

As previously mentioned, the polymer composition (C) contains a poly(aryl ether ketone) (P1) chosen from polyetheretherketones, polyetherketoneketones and polyetheretherketone-polyetherketoneketone copolymers.

For the purpose of the present invention, the term "polyetheretherketone" is intended to denote any polymer of which more than 50 wt % of the recurring units are recurring units of formula

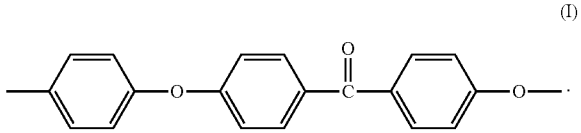

(I)

For the purpose of the present invention, the term "polyetherketoneketone" is intended to denote any polymer of which more than 50 wt % of the recurring units are recurring units of formula

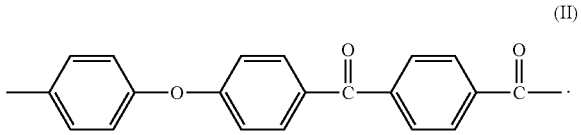

(II)

For the purpose of the present invention, the term "polyetheretherketone-polyetherketoneketone copolymer" is intended to denote any polymer of which no more than 50 wt % of the recurring units are of formula

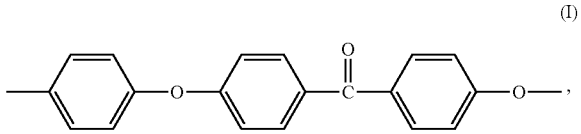

(I)

and no more than 50 wt % of the recurring units are of formula

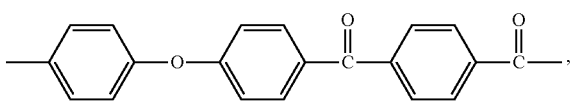
(II)

but more than 50 wt % of the recurring units are recurring units chosen from recurring units (I) and (II).

For the purpose of the present invention, recurring units (I) and (II) are globally referred to as recurring units (R1).

The poly(aryl ether ketone) (P1) is preferably a polyetheretherketone.

The poly(aryl ether ketone) (P1) may be notably a homopolymer, a random, alternate or block copolymer.

When the poly(aryl ether ketone) (P1) is a copolymer, its recurring units may notably be composed of (i) recurring units (R1) of formulae (I) and (II), or (ii) recurring units (R1) of one or more formulae (I) and (II) and recurring units (R1*) different from recurring units (R1), such as:

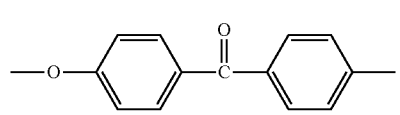
(III)

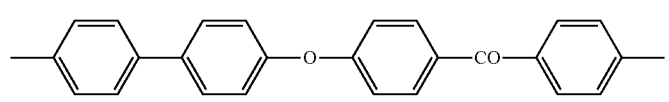
(IV)

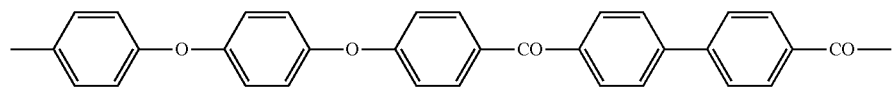
(V)

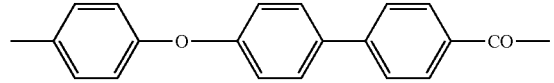
(VI)

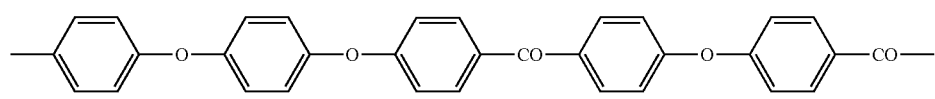
(VII)

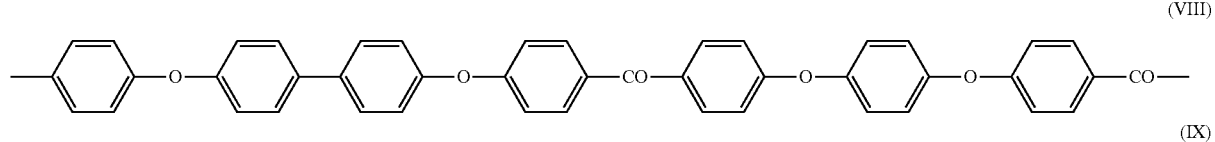
(VIII)

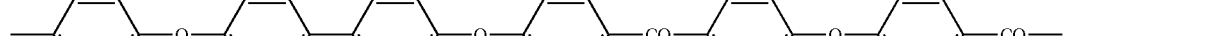
(IX)

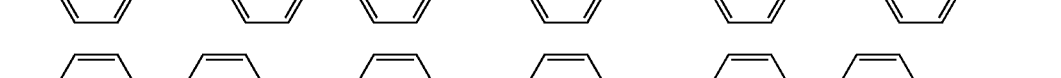
(X)

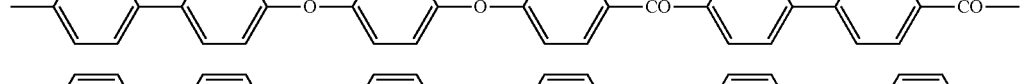
(XI)

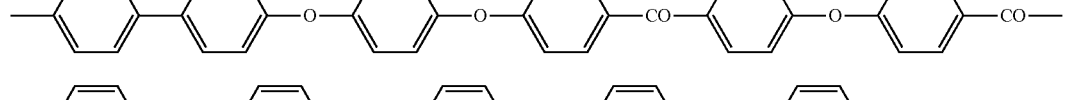
(XII)

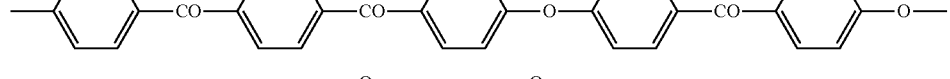
(XIII)

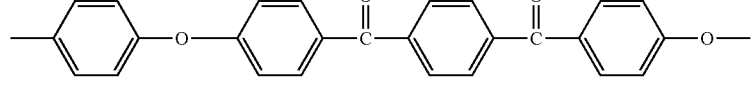
(XIV)

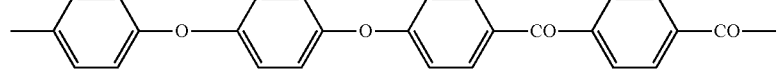
(XV)

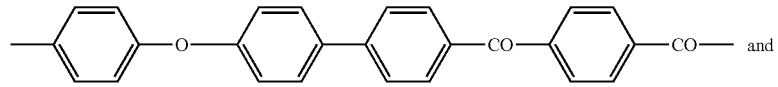 and

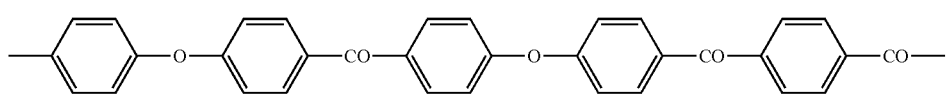

(XVI)

Preferably more than 70 wt %, and more preferably more than 85 wt % of the recurring units of the poly(aryl ether ketone) (P1) are recurring units (R1). Still more preferably, essentially all the recurring units of the poly(aryl ether ketone) (P1) are recurring units (R1). Most preferably, all the recurring units of the poly(aryl ether ketone) (P1) are recurring units (R1). Excellent results were obtained when the poly(aryl ether ketone) (P1) was a polyetheretherketone homopolymer, i.e. a poly(aryl ether ketone) of which all the recurring units are recurring units (I).

The poly(aryl ether ketone) (P1) has advantageously a reduced viscosity (RV) of at least 0.60 dl/g, as measured in 95-98% sulfuric acid (d=1.84 g/ml) at a poly(aryl ether ketone) concentration of 1 g/100 ml. The measurement is performed using a No 50 Cannon-Fleske viscometer. RV is measured at 25° C. in a time less than 4 hours after dissolution. The RV of the poly(aryl ether ketone) (P1) is preferably of at least 0.65 dl/g, more preferably of at least 0.70 dl/g. Besides, the RV of the poly(aryl ether ketone) (P1) is advantageously of at most 1.20 dl/g and preferably at most 1.10 dl/g. In certain instances, the best results are obtained when the poly(aryl ether ketone) (P1) has a RV of from 0.70 to 0.90 dl/g; in certain other instances, the best results are obtained when the poly(aryl ether ketone) (P1) has a RV of from 0.90 to 1.10 dl/g.

The poly(aryl ketone) (P1) can be prepared by any method.

One well known in the art process to produce poly(aryl ether ketone)s, in particular PEEK homopolymers, comprises the step of reacting a usually substantially equimolar mixture of at least one bisphenol with at least one dihalobenzoid compound, and/or at least one halophenol compound (nucleophilic polycondensation reaction), as described in Canadian Pat. No. 847,963 and U.S. Pat. No. 4,176,222, the whole content of both being herein incorporated by reference. A preferred bisphenol in such a process is hydroquinone; preferred dihalobenzoid compounds in such a process are 4,4'-difluorobenzophenone, 4,4'-dichlorobenzophenone and 4-chloro-4'-fluorobenzophenone; preferred halophenols compounds in such a process are 4-(4-chlorobenzoyl)phenol and 4-(4-fluorobenzoyl)phenol.

Another well known in the art process to produce PEEK homopolymers comprises the step of electrophilically polymerizing phenoxyphenoxybenzoic acid or the like, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

Polyetheretherketone homopolymers are commercially available notably from Solvay Advanced Polymers, L.L.C. as ICETASPIRE™ and GATONE® poly(aryl ether ketone)s. Polyetheretherketone homopolymers are also commercially available from VICTREX Manufacturing Limited.

The Polyphenylsulfone (P2)

For the purpose of the invention, a polyphenylsulfone is intended to denote a polycondensation polymer of which more than 50 wt % of the recurring units are recurring units (R2) of formula

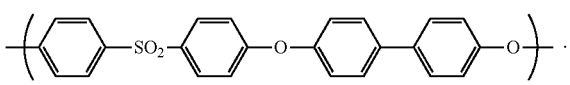

(1)

The polyphenylsulfone (P2) may be notably a homopolymer, a random, alternate or block copolymer. When the polyphenylsulfone (P2) is a copolymer, its recurring units may notably be composed of recurring units (R2) of formula (I) and recurring units (R2*), different from recurring units (R2), such as:

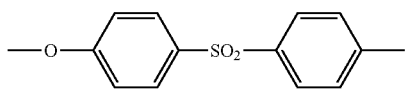

(2)

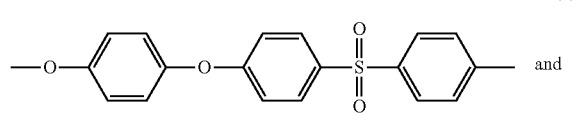

(3)

and

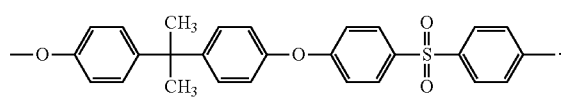

(4)

Preferably more than 70 wt %, and more preferably more than 85 wt % of the recurring units of the polyphenylsulfone (P2) are recurring units (R2). Still more preferably, essentially all the recurring units of the polyphenylsulfone (P2) are recurring units (R2). Most preferably, all the recurring units of the polyphenylsulfone (P2) are recurring units (R2), i.e. the polyphenylsulfone (P2) is a homopolymer. RADEL® R polyphenylsulfones from Solvay Advanced Polymers, L.L.C. are examples of commercially available polyphenylsulfone homopolymers.

The polyphenylsulfone (P2) can be prepared by any method. Methods well known in the art are those described in U.S. Pat. Nos. 3,634,355; 4,008,203; 4,108,837 and 4,175,175, the whole content of which is herein incorporated by reference.

The Reinforcing Fiber (F)

Any reinforcing fiber is desirable as the reinforcing fiber (F). The skilled person will easily recognize the reinforcing fiber which fits best its composition and encompassed end uses. Generally, the reinforcing fiber (F) is chosen depending on its chemical nature, its length, diameter, ability to feed nicely in compounding equipment without bridging and surface treatment (notably because good interfacial adhesion between the reinforcing fiber (F) and the polymer improves the stiffness and the toughness of the blend).

Non limitative examples of suitable reinforcing fibers include glass fibers, asbestos, graphitic carbon fibers (some of them having possibly a graphite content of above 99%), amorphous carbon fibers, pitch-based carbon fibers (some of them having possibly a graphite content of above 99%), PAN-based carbon fibers, synthetic polymeric fibers, aluminum fibers, aluminum silicate fibers, oxide of metals of such aluminum fibers, titanium fibers, magnesium fibers, rock wool fibers, steel fibers, silicon carbide fibers, boron fibers and so on.

Preferably, the reinforcing fiber (F) is chosen from glass fibers and carbon fibers. More preferably, it is glass fiber.

The reinforcing fiber (F), in particular the glass fiber, has a diameter preferably below 40 μm: the Applicant observed that this resulted in increased reinforcement. More preferably, its diameter is below 20 μm, and still more preferably below 15 μm. On the other hand, the diameter of the reinforcing fiber (F), in particular the glass fiber, is preferably above 5 μm.

The reinforcing fiber (F), in particular the glass fiber, has a length preferably of below 20 mm, more preferably below 10 mm. Besides, it has a length of preferably above 1 mm, more preferably above 2 mm.

Preferably, the reinforcing fiber (F), in particular the glass fiber, is formulated with a high temperature sizing. The Applicant observed that said high temperature sizing provided superior interfacial adhesion with polymers that require generally to be processed at high temperatures, like PEEK, PEKK and PPSU.

Especially well-suited reinforcing fibers are VETROTEX® grade SGVA 910 chopped fiberglass from VETROTEX SAINT-GOBAIN and equivalents thereof.

Optional Ingredients of the Polymer Composition (C)

The polymer composition (C) may further contain conventional ingredients of poly(aryl ether ketone) and poly(aryl ether sulfone) compositions, including lubricating agents, heat stabilizers, anti-static agents, extenders, organic and/or inorganic pigments like $TiO_2$, carbon black, acid scavengers, such as MgO, stabilizers, i.e., metal oxides and sulfides such as zinc oxide and zinc sulfide, antioxidants, flame retardants, smoke-suppressing agents, and particulate fillers and nucleating agents such as talc, mica, titanium dioxide, kaolin and the like.

The weight of said optional ingredients, based on the total weight of polymer composition (C), ranges advantageously from 0 to 15%, preferably from 0 to 10% and more preferably from 0 to 5%.

Embodiment (Emb-1)

In a certain embodiment of the present invention, a pigmented polymer composition (C) is desirable. The case being, the pigment is preferably zinc sulfide. The Applicant has found, that, in the invention compositions, zinc sulfide, contrarily to other widely used pigments such as titanium dioxide, worked especially well in combination with the reinforcing fiber (F), in particular with glass fiber. In particular, and contrarily to titanium dioxide, zinc sulfide had no "scribing effect" and did not cause the reinforcing fiber (F) to break, which would have otherwise resulted in an undesirable loss of strength. According to this embodiment, zinc sulfide is preferably present in a weight amount of below 10%, and more preferably at most 5%, based on the total weight of the polymer composition (C); on the other hand, zinc sulfide is preferably present in a weight amount of at least 1%, and preferably at least 2% based on the total weight of the polymer composition (C).

Embodiment (Emb-2)

In a certain other embodiment of the invention, the amounts of the ingredients of the polymer composition (C), in their preferred ranges of value, may differ from those above detailed, which were optimized to achieve the best balance of properties for most general end uses.

While the polymer composition (C) according to embodiment (Emb-2) can be used profitably in various applications, it is especially well suited for certain particular applications such as compressor plates.

Specifically according to embodiment (Emb-2), we have that:

the weight of the poly(aryl ether ketone) (P1), based on the total weight of the poly(aryl ether ketone) (P1) and the polyphenylsulfone (P2), is advantageously above 20%, preferably above 30%, more preferably above 40%, still more preferably above 45%, even more preferably above 50% and most preferably greater than or equal to 60%; on the other hand, the weight of the poly(aryl ether ketone) (P1), based on the total weight of the poly(aryl ether ketone) (P1) and the polyphenylsulfone (P2), is advantageously below 80%, and preferably below 70%;

the total weight of the poly(aryl ether ketone) (P1) and the polyphenylsulfone (P2), based on the total weight of the polymer composition (C), is advantageously above 35%, preferably above 55% and more preferably above 65%; on the other hand, the total weight of the poly(aryl ether ketone) (P1) and the polyphenylsulfone (P2), based on the total weight of the polymer composition (C), is advantageously below 85%, preferably below 80 and more preferably below 75%;

the weight of the poly(aryl ether ketone) (P1), based on the total weight of the polymer composition (C), is advantageously above 15%, preferably above 25%, more preferably above 30%, still more preferably above 35% and most preferably above 40%; on the other hand, the weight of the poly(aryl ether ketone) (P1), based on the total weight of the polymer composition (C), is advantageously below 50% and preferably at most 45%;

the weight of the polyphenylsulfone (P2), based on the total weight of the polymer composition (C), is advantageously above 15%, preferably above 20% and more preferably of at least 25%; on the other hand, the weight of the polyphenylsulfone (P2), based on the total weight of the polymer composition (C), is advantageously below 50%, preferably below 45%, more preferably below 40%, still more preferably at most 35% and most preferably at most 30%;

the amount of reinforcing fiber (F), based on the total weight of the polymer composition (C), is advantageously above 12 wt %, preferably above 18 wt % and more preferably above 24 wt %; on the other hand, the amount of reinforcing fiber (F), based on the total weight of the polymer composition (C), is advantageously below 60 wt %, preferably below 48 wt %, and more preferably below 36 wt %, and still more preferably at most 30 wt %.

The polymer composition (C) is advantageously prepared by any conventional mixing method. A preferred method contains dry mixing the ingredients of the invented polymer composition of concern in powder or granular form, using e.g. a mechanical blender, then extruding the mixture into strands and chopping the strands into pellets.

Non limitative examples of shaped articles or part of shaped articles in accordance with the present invention include parts of aircraft passenger service units, air return grills in aircrafts, parts of aircraft heating systems, parts of aircraft ventilation systems, parts encapsulating a dry transformer or a motor coil, food service equipments, dental cases, medical instruments, plumbing fittings, fixtures and compressor plates.

The Chemical Environment

The polymer composition (C) is susceptible of being temporarily or permanently in contact with the chemical environment; often, such temporary or permanent contact is effectively achieved.

Non limitative examples of chemical media susceptible of constituting or being part of the chemical environment include: carboxylic acid esters, carboxylic acids, glycol ethers, aliphatic hydrocarbons, aromatic hydrocarbons such as benzene and toluene, monostyrene, phenols, epoxies, epoxy precursors such as propylene glycol monoether and ethylene glycol diglycidyl ether, ketones like methyl ethyl ketone and acetone, chlorinated hydrocarbons like methylene chloride, chloroform and carbon tetrachloride and aqueous solutions of inorganic acids such as nitric acid and sulfuric acid.

The polymer composition (C) is also susceptible of being temporarily or permanently submitted to stress; often, the polymer composition is effectively temporarily or permanently submitted to stress.

In a certain embodiment of the present invention, the polymer composition (C) is temporarily or permanently in contact with the chemical environment, and, at the same time and/or at different times, it is temporarily or permanently submitted to stress.

The expression "for diluting a poly(aryl ether ketone) (P1) ( . . . ) contained in a polymer composition (C)", as previously used, should herein be understood in its broad sense, namely: "for reducing the concentration of the poly (aryl ether ketone) (P1) contained in the polymer composition (C)". Typically, such dilution can be achieved by replacing part of the poly(aryl ether ketone) (P1) by the polyphenylsulfone (P2). A benefit resulting from the dilution of the "concentrated" polymer composition [i.e. the one consisting of the poly(aryl ether ketone) (P1), the reinforcing fiber (F) and, optionally in addition, one or more ingredients other than the poly(aryl ether ketone) (P1), the polyphenylsulfone (P2) and the reinforcing fiber (F)] is that the so-obtained "diluted" polymer composition (C) is more cost-attractive, because polyphenylsulfones are not as expensive as poly(aryl ether ketone)s.

The polymer composition (C) may have been prepared and its chemical resistance may have been assessed by a certain skilled person, before said skilled person uses the polyphenylsulfone (P2) for diluting the poly(aryl ether ketone) (P1) in accordance with the presently invented use. This scenario is however not required at all: the presently invented use should be understood to be implemented as well, notably, as soon as a polymer concentration (C) is conceived by a skilled person to the purpose of exhibiting in a certain environment a chemical resistance at least substantially equal to the effectively measured or reasonably estimated chemical resistance of a poly(aryl ether ketone)-containing polyphenylsulfone-free polymer composition, whatever the way this person has been made aware of the effectively measured or reasonably estimated chemical resistance of this poly(aryl ether ketone)-containing polyphenylsulfone-free polymer composition, and the so-conceived polymer composition (C) is then prepared on this basis.

The fact that, according to the present invention, the chemical resistance of the polymer composition (C) is at least substantially maintained means usually that the polymer composition (C) (the "diluted" polymer composition) has a chemical resistance in the chemical environment, which is either lower than but close to that of the "concentrated" polymer composition, or equal to that of polymer concentration (C), or greater than that of polymer concentration (C). Otherwise said, in this chemical environment, the polymer composition (C) has not a chemical resistance substantially lower than that of the "concentrated" polymer concentration.

Preferably, in the present invention, the chemical resistance of the "concentrated" polymer composition is at least essentially maintained, i.e. the polymer composition (C) has usually a chemical resistance in the chemical environment which is the same or essentially the same as that of the "concentrated" polymer composition, or it is even greater than that of the "concentrated" polymer concentration.

The polymer composition (C) exhibits an outstanding balance of properties, including a very high stiffness and a very high chemical resistance. Quite surprisingly, its environmental stress rupture resistance is at least substantially as high as that of reinforced poly(aryl ether ketone)s, and much higher than that of reinforced polyphenylsulfones. In addition, the polymer composition (C) is less expensive than reinforced poly(aryl ether ketone)s.

The present invention is described in greater detail below by referring to the examples; however, the present invention is not limited to these examples.

EXAMPLE 1

A first polymer composition (E1) was prepared according to the present invention:

| | |
|---|---|
| RADEL ® R-5100 NT polyphenylsulfone | 34.0% |
| VICTREX ® 150 P polyetheretherketone | 34.0% |
| CERTAINTEED ® 910 P glass fiber | 29.0% |
| Zinc sulfide | 3.0% |

The polyphenylsulfone, the polyetheretherketone, the glass fiber and the zinc sulfide were mixed and melt compounded using a 25 mm diameter twin screw double vented Berstorff extruder having an L/D ratio of 33/1.

The exemplified composition exhibited outstanding properties, as detailed in the specification.

EXAMPLE 2

A second polymer composition (E2) is prepared according to the present invention:

| | |
|---|---|
| RADEL ® R-5000 NT polyphenylsulfone | 34.0% |
| VICTREX ® 450 P polyetheretherketone | 34.0% |
| CERTAINTEED ® 910 P glass fiber | 29.0% |
| Zinc sulfide | 3.0% |

The polyphenylsulfone, the polyetheretherketone, the glass fiber and the zinc sulfide are mixed and melt compounded using a 25 mm diameter twin screw double vented Berstorff extruder having an L/D ratio of 33/1.

The exemplified composition exhibits also outstanding properties, as detailed in the specification.

EXAMPLE 3

A third polymer composition (E3) is prepared according to the present invention:

| | |
|---|---|
| RADEL ® R-5100 NT polyphenylsulfone | 25.9% |
| VICTREX ® 150 P polyetheretherketone | 44.0% |
| CERTAINTEED ® 910 P glass fiber | 30.0% |
| Zinc oxide | 0.1% |

Thus, the polyphenylsulfone, the polyetheretherketone, the glass fiber and the zinc oxide are mixed and melt compounded using a 25 mm diameter twin screw double vented Berstorff extruder having an L/D ratio of 33/1.

A compressor plate is made from the polymer composition. It exhibits outstanding properties.

EXAMPLE 4

A fourth polymer composition (E4) is prepared according to the present invention:

| | |
|---|---|
| RADEL ® R-5000 NT polyphenylsulfone | 25.9% |
| VICTREX ® 450 P polyetheretherketone | 44.0% |
| CERTAINTEED ® 910 P glass fiber | 30.0% |
| Zinc oxide | 0.1% |

Thus, the polyphenylsulfone, the polyetheretherketone, the glass fiber and the zinc oxide are mixed and melt compounded using a 25 mm diameter twin screw double vented Berstorff extruder having an L/D ratio of 33/1.

A compressor plate is made from the polymer composition. It exhibits also outstanding properties.

EXAMPLE 5

A fifth polymer composition (E5) was prepared in accordance with the present invention. Five comparative polymer compositions (CE1) to (CE5) were also prepared. The nature and weight amount of their ingredients is shown in Table 1. The weight amounts are based on the total weight of the polymer compositions of concern.

TABLE 1

Nature and weight amount of the ingredients of (E5) and (CE1) to (CE5)

| | (CE1) | (CE2) | (CE3) | (CE4) | (E5) | (CE5) |
|---|---|---|---|---|---|---|
| RADEL ® R-5000 NT polyphenylsulfone (wt. %) | 100 | 50 | 0 | 67 | 34 | 0 |
| VICTREX ® 150P polyetheretherketone (wt. %) | 0 | 50 | 100 | 0 | 34 | 70 |
| VETROTEX ® grade SGVA 910 chopped fiberglass (wt. %) | 0 | 0 | 0 | 29 | 29 | 30 |
| Zinc sulfide (wt. %) | 0 | 0 | 0 | 3 | 3 | 0 |
| Zinc oxide (wt. %) | 0 | 0 | 0 | 1 | 0 | 0 |
| Total (wt. %) | 100 | 100 | 100 | 100 | 100 | 100 |

Victrex® 150P polyetheretherketone was received in a coarse powder form. VETROTEX® grade SGVA 910 fiberglass is a 10 micron nominal diameter glass fiber available from Saint Gobain VETROTEX.

Except for (CE1), which was received in pellet form and directly injection molded into flexural test specimens, the polymer compositions were compounded on a Berstorff ZE 25 mm co-rotating intermeshing twin-screw extruder having eight barrel sections and an overall L/D ratio of 40:1. The compounding conditions that were used are shown in Table 2.

TABLE 2

Compounding conditions for polymer compositions (E5) and (CE2) to (CE5)

| | (CE2) and (CE3) | (CE4), (E5) and (CE5) |
|---|---|---|
| Barrel 1 set point (° C.) | No heat | No heat |
| Barrel 2 set point (° C.) | 330 | 330 |
| Barrel 3 set point (° C.) | 330 | 330 |
| Barrel 4 set point (° C.) | 330 | 330 |
| Barrel 5 set point (° C.) | 340 | 340 |
| Barrel 6 set point (° C.) | 340 | 340 |
| Barrel 7 set point (° C.) | 340 | 340 |
| Barrel 8 set point (° C.) | 340 | 340 |
| Die adapter set point (° C.) | 340 | 340 |
| Die set point (° C.) | 340 | 340 |
| Actual melt temperature (° C.) | 380-385 | 390-405 |
| Screw speed (rpm) | 240 | 240 |
| Vacuum at barrel 7 (in Hg) | >27 | >27 |
| Resin feed rate (lb/h) | 20 | 18.9 |
| Fiberglass feed Rate (lb/h) | — | 8.1 |

In order to assess the chemical resistance capabilities of polymer compositions (E5) and (CE1) to (CE5), each of them was first molded into a inch long×0.5 inch wide×0.125 inch thick ASTM flexural bar using a 150 ton Toshiba injection molding machine using barrel temperature settings in the range 350-375° C. to result in melt temperatures in the 380-395° C. range. Mold temperatures were maintained in the 170-190° C. By this way, low molded in stresses were achieved; also, high crystallinity levels were achieved for the polymer compositions containing polyetheretherketone PEEK (which is semi-crystalline). Before subjecting any of the specimens to chemical resistance testing, all flexural bars were annealed in an air convection oven at 200° C. for 2 hours. This was done for the dual purpose of removing any remaining molded in residual stresses from the molded parts and to achieve full crystallinity of the crystallizable component PEEK when present in the polymer compositions. This ensured that process-related variabilities were taken out from the comparison of the samples of the various formulations.

In preparation of chemical resistance evaluations, the annealed flex bars were mounted on a stainless parabolic flexural jig that produced a strain of 2.0%. Each bar was fixed onto the parabolic jig by means of four evenly spaced hose clamps.

The jigs with samples mounted were immersed in three solvents at room temperature (23° C.), namely acetone, methyl ethyl ketone and chlorobenzene, for assessing chemical resistance performance in harsh chemical environments in an accelerated fashion. Acetone, methyl ethyl ketone and chlorobenzene were selected for these evaluations as exemplary industrial solvents that are widely utilized in many industries. They also represent two classes of chemicals (ketones and chlorinated hydrocarbons) that are generally very harsh to amorphous engineering plastics, and to aromatic sulfone polymers, in particular polyphenylsulfone. The choice of these solvents was only to exemplify the features and benefits of this invention but are not to be construed as limitative in any way.

The strained specimens were soaked in the chemicals for a total duration of 96 hours (4 days). As well known from the skilled person, strain under chemical exposure may induce crazing or cracking in the test parabolic jigs.

The samples were inspected for signs of possible mechanical failure or physical damage at the end of the four days; they were also examined for signs of dissolution, softening or swelling upon soaking in each of the solvents considered. A test in a given solvent was considered to be passed successfully by a polymer composition when no mechanical failure, no physical damage, no sign of dissolution, no sign of softening and no sign of swelling was observed. On the other hand, the observation of any of such phenomena constituted failure of the polymer material in the test.

It should be emphasized that the above detailed conditions, with a strain as high as 2.0% and a 4-day duration, are extremely harsh, so that a material passing this test is usually considered by the skilled in the art as capable in practice of meeting the requirements needed by the most severe applications.

The results from the solvent resistance evaluations are provided in Table 3. The "V" attribute means that the polymer composition of concern, in the solvent of concern, passed the test successfully; on the other hand, the "O" attribute means that the polymer composition of concern, in the solvent of concern, failed to pass the test.

TABLE 3

Test results after immersion in various chemically aggressive solvents

| Nature of the solvent | (CE1) | (CE2) | (CE3) | (CE4) | (E5) | (CE5) |
|---|---|---|---|---|---|---|
| Acetone | O | O | O | O | V | V |
| Methyl ethyl ketone | O | O | O | O | V | V |
| Chlorobenzene | O | O | O | O | V | V |

The reinforced polyphenylsulfone composition (CE4) failed lamentably to pass the tests in any of the solvents considered.

In an unexpected manner, the invention reinforced polymer composition (E5), passed the tests in all three solvents successfully, as brilliantly as the reinforced polyetheretherketone (CE5) did.

The invention reinforced polymer composition (E5) is less expensive than the reinforced polyetheretherketone (CE5).

None of the unreinforced materials (CE1), (CE2) and (CE3) passed any test successfully.

The invention claimed is:
1. A polymer composition (C) comprising
a poly(aryl ether ketone) (P1), of which more than 50 wt % of the recurring units are recurring units of the formula:

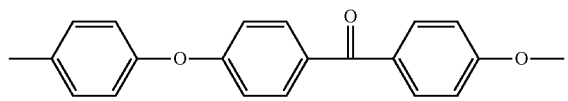

a polyphenylsulfone (P2) of which more than 50 wt % of the recurring units are recurring units of the formula:

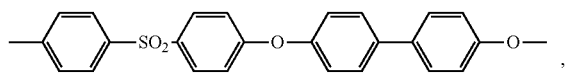

and
a reinforcing fiber (F), wherein
the weight of the poly(aryl ether ketone) (P1), based on the total weight of the poly (aryl ether ketone) (P1) and the polyphenylsulfone (P2), is above 30% and below 80%, and
the reinforcing fiber (F) comprises either a glass fiber, present in an amount of the range 25 to 48 wt % based on the weight of the polymer composition (C), or a carbon fiber, present in an amount of the range 12 to 40% based on the weight of the polymer composition (C).
2. The polymer composition according to claim 1, wherein the weight of the poly(aryl ether ketone) (P1), based on the total weight of the poly(aryl ether ketone) (P1) and the polyphenylsulfone (P2), is above 30% and below 70%.
3. The polymer composition according to claim 1, wherein the weight of the poly(aryl ether ketone) (P1), based on the total weight of the poly(aryl ether ketone) (P1) and the polyphenylsulfone (P2), is above 40% and below 60%.
4. The polymer composition according to claim 1, wherein the total weight of the poly(aryl ether ketone) (P1) and the polyphenylsulfone (P2), based on the total weight of the polymer composition (C), is above 55%.
5. The polymer composition according to claim 1, wherein the total weight of the poly(aryl ether ketone) (P1) and the polyphenylsulfone (P2), based on the total weight of the polymer composition (C), is above 65%, and wherein the amount of reinforcing fiber (F), based on the total weight of the polymer composition (C), is above 24 wt %.
6. The polymer composition according to claim 1, wherein the reinforcing fiber (F) is the glass fiber.
7. The polymer composition according to claim 1, wherein said polymer composition further comprises zinc sulfide.
8. A shaped article comprising the polymer composition according to claim 1.
9. The polymer composition according to claim 2, wherein the total weight of the poly(aryl ether ketone) (P1) and the polyphenylsulfone (P2), based on the total weight of the polymer composition (C) is above 55%.
10. The polymer composition according to claim 3, wherein the total weight of the poly(aryl ether ketone) (P1) and the polyphenylsulfone (P2), based on the total weight of the polymer composition (C) is above 65%, and wherein the amount of reinforcing fiber (F), based on the total weight of the polymer composition (C), is above 24 wt %.

11. A polymer composition (C) comprising
a poly(aryl ether ketone) (P1), which is a polyetheretherketone of which essentially all the recurring units are recurring units of the formula

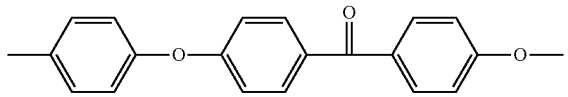

a polyphenylsulfone (P2) of which essentially all the recurring units are recurring units of the formula

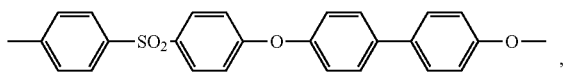

and
above 12 and below 40 wt %, based on the weight of the polymer composition (C), of a reinforcing fiber (F) which is a carbon fiber, wherein
the weight of the poly (aryl ether ketone) (P1), based on the total weight of the poly(aryl ether ketone) (P1) and the polyphenylsulfone (P2), is above 30% and below 80%.

12. The polymer composition according to claim 11, wherein the weight of the poly(aryl ether ketone) (P1), based on the total weight of the poly(aryl ether ketone) (P1) and the polyphenylsulfone (P2), is above 30% and below 70%.

13. The polymer composition according to claim 11, wherein the weight of the poly(aryl ether ketone) (P1), based on the total weight of the poly(aryl ether ketone) (P1) and the polyphenylsulfone (P2), is above 40% and below 60%.

14. The polymer composition according to claim 12, wherein the total weight of the poly(aryl ether ketone) (P1) and the polyphenylsulfone (P2), based on the total weight of the polymer composition (C), is above 55%.

15. The polymer composition according to claim 13, wherein the total weight of the poly(aryl ether ketone) (P1) and the polyphenylsulfone (P2), based on the total weight of the polymer composition (C), is above 65%, and wherein the amount of reinforcing fiber (F), based on the total weight of the polymer composition (C) is above 24 wt %.

16. A polymer composition (C) comprising
a poly(aryl ether ketone) (P1), which is a polyetheretherketone of which essentially all the recurring units are recurring units of the formula

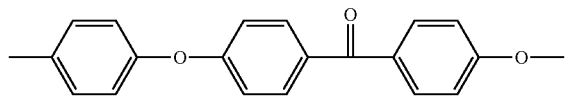

a polyphenylsulfone (P2) of which essentially all the recurring units are recurring units of the formula

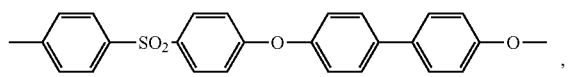

and
above 25 and below 48 wt %, based on the weight of the polymer composition (C), of a reinforcing fiber (F) which is glass fiber, wherein
the weight of the poly (aryl ether ketone) (P1), based on the total weight of the poly(aryl ether ketone) (P1) and the polyphenylsulfone (P2), is above 30% and below 80%.

17. The polymer composition according to claim 16, wherein the weight of the poly(aryl ether ketone) (P1), based on the total weight of the poly(aryl ether ketone) (P1) and the polyphenylsulfone (P2), is above 30% and below 70%.

18. The polymer composition according to claim 16, wherein the weight of the poly(aryl ether ketone) (P1), based on the total weight of the poly(aryl ether ketone) (P1) and the polyphenylsulfone (P2), is above 40% and below 60%.

19. The polymer composition according to claim 16, wherein the total weight of the poly(aryl ether ketone) (P1) and the polyphenylsulfone (P2), based on the total weight of the polymer composition (C), is above 55%.

20. The polymer composition according to claim 17, wherein the total weight of the poly(aryl ether ketone) (P1) and the polyphenylsulfone (P2), based on the total weight of the polymer composition (C), is above 55%.

21. The polymer composition according to claim 17, wherein the total weight of the poly(aryl ether ketone) (P1) and the polyphenylsulfone (P2), based on the total weight of the polymer composition (C), is above 65%, and wherein the amount of reinforcing fiber (F), based on the total weight of the polymer composition (C) is above 25 wt %.

22. The polymer composition according to claim 1, wherein the reinforcing fiber (F) is the carbon fiber.

* * * * *